United States Patent

[11] 3,617,171

| [72] | Inventor | Joachim Ribka<br>Offenbach, am Main, Germany |
|---|---|---|
| [21] | Appl. No. | 882,323 |
| [22] | Filed | Dec. 4, 1969 |
| [45] | Patented | Nov. 2, 1971 |
| [73] | Assignee | Farbwerke Hoechst Aktiengesellschaft<br>vormals Meister, Lucius & Bruning<br>Frankfurt, am Main, Germany |
| [32] | Priority | Dec. 9, 1968 |
| [33] | | Germany |
| [31] | | P 18 13 522.3 |

[54] DYESTUFF MIXTURES OF WATER-INSOLUBLE DISAZO DYESTUFFS AND PROCESS FOR THEIR PREPARATION
4 Claims, No Drawings

[52] U.S. Cl. .................................................. 8/26,
106/22, 106/23, 106/288, 260/37, 260/161, 8/162
[51] Int. Cl. ........................................................ D06p 1/00
[50] Field of Search ............................................... 8/26;
260/161, 37; 106/22, 23

[56] References Cited
UNITED STATES PATENTS

| 2,031,426 | 2/1936 | Niemann ...................... | 260/161 |
|---|---|---|---|
| 2,646,338 | 7/1953 | Kappeler et al .............. | 8/26 |

FOREIGN PATENTS

| 601,615 | 7/1960 | Canada ........................ | 260/161 |

Primary Examiner—George F. Lesmes
Assistant Examiner—Patricia C. Ives
Attorney—Curtis, Morris & Safford ABSTRACT: Dyestuff mixtures of water-insoluble disazo dyestuffs consisting of two symmetrical disazo dyestuffs and one asymmetrical disazo dyestuff and process for preparing them by coupling in a molar ratio of 1:2 tetrazotized 4,4'-diamino-3,3'-dichlorodiphenyl with a mixture of 1-phenyl-3-methyl-pyrazolone-(5) and 1-p-tolyl-3-methyl-pyrazolone-(5). Said mixture can be used for the preparation of printing inks and for dyeing and printing plastic masses, synthetic or natural resins, paper, textiles, and spinning solutions. The dyeings and printings obtained with said mixtures are above all distinguished by a very good fastness to light.

DYESTUFF MIXTURES OF WATER-INSOLUBLE DISAZO DYESTUFFS AND PROCESS FOR THEIR PREPARATION

The present invention provides new valuable dyestuff mixtures which consist of two symmetrical water-insoluble disazo dyestuffs having the formulae A and B and an unsymmetrical water-insoluble disazo dyestuff of formula C

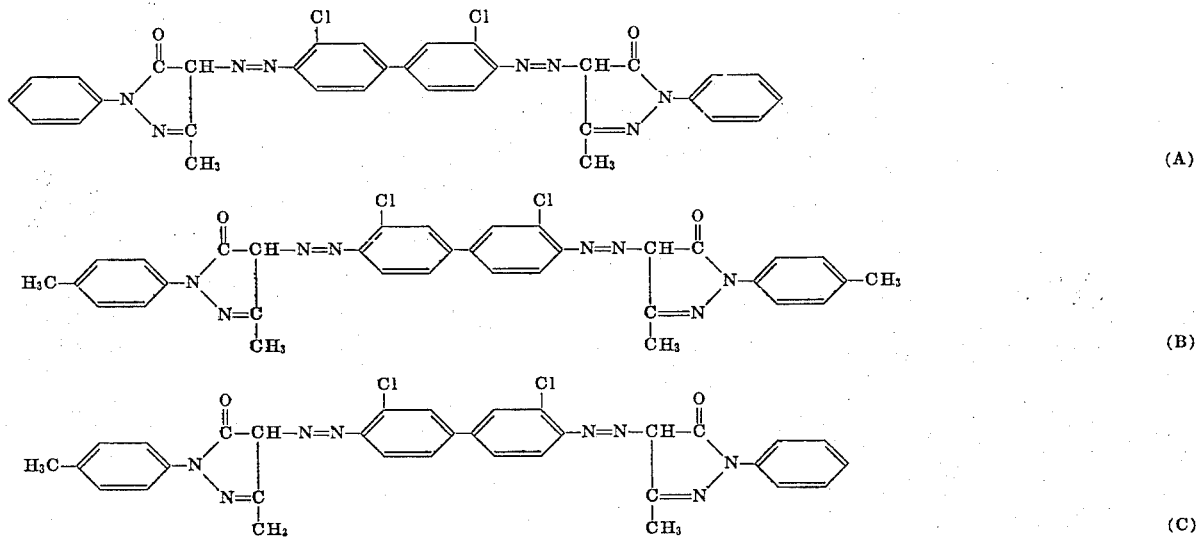

This invention, moreover, provides a process for preparing said mixture which comprises coupling in a molar ratio of 1:2 tetrazotized 4,4'-diamino-3,3'-dichlorodiphenyl with a mixture of 1-phenyl-3-methyl-pyrazolone-(5) and 1-p-tolyl-3-methyl-pyrazolone-(5).

The dyestuff of the above-identified formula A has been known for many years. It figures in the Color-Index (2nd edition 1956) as Pigment Orange 13 i.e. CI 21110, and is obtained by coupling tetrazotized 4,4'-diamino-3,3'-dichlorodiphenyl with 1-phenyl-3-methyl-pyrazolone-(5). In the graphic industry, the high tinctorial strength of said dyestuff is appreciated, however its poor fastness to light constitutes a drawback.

Another dyestuff widely used in the graphic trade for the manufacture of printing inks has the formula B and is listed in the Color Index as Pigment Orange 34 i.e. CI 21115. With the latter, orange dyeings of a more reddish hue are obtained than with Pigment Orange 13. Moreover, these dyeings are deep in shade and also possess—as compared with Pigment Orange 13—the desired better fastness to light.

The shade of both pigments can be varied to a limited extent depending on the mode of preparation of the pigment. In both cases, when the tetrazo solution is poured into the reaction vessel and an alkaline solution of the coupling component is allowed to run into the tetrazo solution, a more reddish orange pigment results than with a coupling component introduced into the reaction vessel in dispersed form and combined with the tetrazo solution in the presence of a buffer. Now, with Pigment Orange 13 and Pigment Orange 34 the printing ink industry has at its disposal two orange pigments of high tinctorial strength the first one of which yields more yellowish shades, insufficiently fast to light, while the second provides more reddish dyeings having good fastness to light. Unto the present, an orange pigment such as would correspond in shade and tinctorial strength to Pigment Orange 13, but have better fastness to light has been unavailable.

The instantly claimed process now provides a pigment having the desired properties. According to —same, a mixture of the three disazo dyestuffs A, B and C is obtained from which two dyestuff A and B, are already known as Pigment Orange 13 or 34, respectively, while the unsymmetrical dyestuff C is novel and can be detected in the mixture analytically, for example by mass spectrometry. The portion of the new unsymmetrical disazo dyestuff C in the dyestuff mixture depends, essentially, upon the mixing ratio of the two coupling components employed for coupling, i.e. 1-phenyl-3-methyl-pyrazolone-(5) and 1-p-tolyl-3-methyl-pyrazolone-(5). With these two components used, for example, in a molar ratio of 1:1 the portion of the unsymmetrical disazo dyestuff C in the dyestuff mixture is about 50 percent, the two symmetrical ones (A and B) being formed in a percentage of about 25 each. The formation of the new unsymmetrical disazo dyestuff C is vital for the valuable properties of the dyestuff mixture of the invention. Now, this would suggest that the color shades of the dyestuff mixtures of the invention will be comprised between those of the more yellowish Pigment Orange 13 and the shades of the more reddish Pigment Orange 34 according to the molar ratio of the two coupling component mixture. Surprisingly, this is not the case. Thus, for example, when tetrazotized 4,4'-diamino-3,3'-dichlorodiphenyl is coupled with a buffered dispersion of the two coupling component mixture in a molar ratio of 1:1 (cf. example 1), a dyestuff mixture is formed corresponding in shade to the yellowish Pigment Orange 13, Said mixture is distinctly more yellowish than is a mixture of Pigment Orange 13 and 34 of the same molar ration. When the mixed coupling of the present invention of tetrazotized 4,4'-diamino-3,3'-dichlorodiphenyl is performed with a mixture of 1-phenyl-3-methylpyrazolone-(5) and 1-p-tolyl-3-methyl-pyrazolone-(5) of the molar ratio 2:1, a dyestuff mixture is obtained which dyes even more yellowish orange shades than Pigment Orange 13 (cf. example 2). On the other hand, when coupling is conducted in such a manner that the tetrazotized solution of 4,4'-diamino-3,3'-dichlorodiphenyl is put into the vessel and an alkaline solution of a mixture of 1-phenyl-3-methyl-pyrazolone-(5) and 1-p-tolyl-3-methyl-pyrazolone-(5) is added thereto in the same molar ratio, i.e. 2:1, there results a dyestuff mixture yielding more reddish orange shades than pigment Orange 34 (cf. example 3). These unforeseeable and unexpected shades are due to the formation of the unsymmetrical disazo dyestuff C.

The dyestuff mixtures concerned are prepared by coupling tetrazotized 4,4'-diamino-3,3'-dichlorodiphenyl in known manner with a mixture of the coupling components: 1-phenyl-3-methyl-pyrazolone-(5) and 1-p-tolyl-3-methyl-pyrazolone-(5), for example in an aqueous medium, optionally in the presence of a nonionogenic, anionic or cationic dispergent.

The proportion between the two coupling components may vary depending on the technological properties desired for the pigment mixture which is to be prepared. The coupling components can be used in the mixture in molar ratio of 1:1 to 20:1, interchangeably, preferably 1:1 to 5:1.

The disazo dyestuff mixtures yielded by the instant process are water-insoluble pigments. They are especially suitable for the preparation of dyeing inks, coloring in the mass, dyeing or printing of paper or textiles according to pigment-printing or pigment-dyeing methods. Moreover, they may serve for the dyeing of plastic masses, of synthetic or natural resins, lacquers or lacquer formers. They show depending on their respective application field good fastness to light and resistance to chemicals or solvents, possess high tinctorial strength and good transparency of the dyeings.

In comparison with the known single dyestuffs the claimed mixtures enable a broader scale of orange dyeings in respect to shade and fastness to light.

The following examples serve to illustrate the invention. The parts and percentages are by weight unless otherwise stated.

Example 1

18.3 parts of 1-phenyl-3-methyl-pyrazolone-(5) were dissolved at room temperature by stirring in a mixture of 250 parts by volume of water and 14.3 parts of 33 percent sodium hydroxide solution. An aqueous solution of 2 parts of an addition product of about 20 mols of ethylene oxide and one mol of octadecyl alcohol was added thereto. The whole was cooled to 10° C. at which temperature 23.8 parts by volume of 5N hydrochloric acid were allowed to slowly run in, while stirring the mixture. Thereby precipitation occurred. The whole was mixed with 9.5 parts of acetic acid. Then, a solution of 19.7 parts of 1-p-tolyl-3-methyl-pyrazolone-(5) in 250 parts by volume of water and 14.3 parts of 33 percent of sodium hydroxide solution was allowed to run into the mixture. The resulting fine suspension was, furthermore, mixed with 8.2 parts of anhydrous sodium acetate. Subsequently, at 15°–20° C., a solution of tetrazotized 4,4'-diamino-3,3'-dichlorodiphenyl (obtained by stirring 25.3 parts of 4,4'-diamino-3,3'-dichlorodiphenyl with 100 parts by volume of 5N hydrochloric acid and 60 parts by volume of water, tetrazotizing with 40 parts by volume of 5N sodium nitrite solution and clarifying with kieselguhr) was allowed to run in within about half an hour. During the coupling the pH was maintained at about 4,5 by simultaneous addition of dilute sodium hydroxide solution. When coupling was complete, the reaction mixture was heated to 90° C. at which temperature it was maintained for 15 minutes. The product was filtered, washed and dried.

A pigment dyestuff was obtained which, incorporated into a graphic printing ink, yielded orange dyeings of high tinctorial strength and good fastness to light. When worked into an oil-in-water- or water-in-oil emulsion, said dyestuff yielded printing pastes suitable for dyeing fibrous materials, such for example, as cotton, orange shades which had good fastness to light and dry cleaning. A comparison of a dyeing produced with a 10 percent printing ink of this pigment mixture and a corresponding dyeing of Pigment Orange 13 showed that the two dyeings practically had an equal shade, however, the dyeing produced with the dyestuff mixture of the invention was distinctly faster to light.

In preparing the disazo dyestuff mixture of the invention it is advantageous that the coupling components precipitate in form of fine particles. This can be achieved according to example 1 by precipitating the two coupling components successively. With a different procedure followed such as would normally be used, for example a joint dissolution of the coupling components and their common precipitation from the solution, the precipitate would not be in the form mentioned but in form of small greasy lumps that solidify later and can be coupled with difficulties only.

Example 2

24.4 parts of 1-phenyl-3-methyl-pyrazolone-(5) were dissolved at room temperature by stirring in a mixture of 330 parts by volume of water and 19.1 parts of 33 percent sodium hydroxide solution. An aqueous solution of 2 parts of an addition product of about 20 mols of ethylene oxide on 1 mol of oxtadecyl alcohol was added thereto. the whole was cooled to 10° C. at which temperature 31.8 parts by volume of 5N hydrochloric acid were allowed to run slowly into the mixture while stirring, whereby precipitation occurred. 9.5 parts of acetic acid were added and a solution of 13.1 parts of 1-p-tolyl-3-methyl-pyrazolone-(5) in 250 parts by volume of water and 14.3 parts of 33 percent sodium hydroxide solution was allowed to run slowly into the mixture. Into the so-obtained fine suspension, furthermore, 8.2 parts of anhydrous sodium acetate were introduced. Coupling and work up were effected as in example 1.

A pigment dyestuff was obtained which, when worked into a printing ink, yielded orange dyeing of high tinctorial strength, more yellowish in shade than were the corresponding dyeings of Pigment Orange 13.

EXAMPLE 3

To a tetrazo solution of 4,4'-diamino-3,3'dichlorodiphenyl (prepared by stirring 25.3 parts of 4,4'-diamino-3,3'-dichlorodiphenyl in 100 parts by volume of 5N hydrochloric acid and 60 parts by volume of water, tetrazotizing with 40 parts by volume of 5N sodium nitrite solution and clarifying with kieselguhr) an aqueous solution of 2 parts of an addition product of about 20 mols of ethylene oxide on 1 mol of octadecyl alcohol was added and, at 10 ° C., a solution of 24.4 parts of 1-p-tolyl-3-methyl-pyrazolone-(5) in 500 parts by volume of water and 28.6 parts of 33 percent sodium hydroxide solution was allowed ro run into the mixture within about 60 minutes, while stirring. When coupling was complete, the pH of the reaction mixture was adjusted to 5 means of dilute sodium hydroxide solution, the mixture was heated to 90° C. at which temperature it was maintained during 15 minutes. The product was, subsequently, filtered and washed with water.

A pigment dyestuff was obtained which, incorporated into a graphic printing ink, yielded orange dyeings of high tinctorial strength and good fastness to light. A comparison of a dyeing produced with a 10 percent printing ink of this disazo dyestuff mixture and a corresponding dyeing of an equimolar mixture of Pigment Orange 13 and Pigment Orange 34 showed that the dyeing produced with the dyestuff mixture of the invention had a distinctly redder shade and also possessed better fastness to light.

On comparing the dyeing produced with a 10 percent printing ink of the disazo dyestuff mixture obtained according to example 3 with a corresponding dyeing of Pigment Orange 34 it was found that the dyestuff mixture of the invention yielded a dyeing slightly redder in shade.

EXAMPLE 4

18.3 parts of 1-phenyl-3-methyl-pyrazolone-(5) were dissolved at room temperature by stirring in a mixture of 250 parts by volume of water and 14.3 parts of 33 percent sodium hydroxide solution. The solution was cooled to 10° C. at which temperature 23.8 parts by volume of 5N hydrochloric acid were added slowly with stirring. Thereby precipitation occurred. The whole was mixed with 9.5 parts of acetic acid. Then a solution of 19.7 parts of 1-p-tolyl-3-methyl-pyrazolone-(5) in 250 parts by volume of water and 14.3 parts of 33 percent sodium hydroxide solution was allowed to run into the mixture. The obtained fine suspension was, subsequently, mixed with 8.2 parts of anhydrous sodium acetate, whereupon a solution of tetrazotized 4,4'-diamino-3,3'-dichlorodiphenyl (prepared by stirring 25.3 parts of 4,4'-diamino-3,3'-dichlorodiphenyl in 100 parts by volume of 5N hydrochloric acid and 60 parts by volume of water, tetrazotizing with 40 parts by volume of 5N sodium nitrite solution and clarifying with kieselguhr) was allowed to run in within about half an hour at 15°–20° C. During the coupling, the pH was kept at about 4.5 by simultaneous addition of dilute sodium hydroxide solution. A solution of 1 part of dehydroabietylamine in dilute acetic acid was added, the whole heated to 90° C., the product filtered, washed and dried.

A pigment dyestuff was obtained which, when worked into a graphic printing ink yielded orange dyeings of high tinctorial strength, most brilliant, and transparent.

EXAMPLE 5

30.5 parts of 1-phenyl-3-methyl-pyrazolone-(5) were dissolved, at room temperature, by stirring in a mixture of 420 parts by volume of water and 23.8 parts of 33 percent sodium hydroxide solution. An aqueous solution of 2 parts of an addition product of about 20 mols of ethylene oxide on 1 mol of octadecyl alcohol was added. The whole was cooled to 10° C., at which temperature 39.7 parts by volume of 5N hydrochloric acid were allowed to run slowly into the mixture. Thereby precipitation occurred. 2.5 parts of acetic acid were, then, introduced. Subsequently, a solution of 6.6 parts of 1-p-tolyl-3-methyl-pyrazolone-(5) in 100 parts by volume of water and 4.8 parts of 33 percent sodium hydroxide solution was allowed to run into the coupling mixture. The obtained suspension was then mixed with 15.7 parts of anhydrous sodium acetate. Coupling and work up were effected as described in Example 1.

A pigment dyestuff was obtained which, incorporated into a printing ink, yielded orange dyeings that roughly corresponded in shade to the dyeings of the dyestuff of example 3.

EXAMPLE 6

The same procedure as in example 3 was followed, however using 1.8 parts of 1-phenyl-3-methyl-pyrazolone-(5) and 37.4 parts of 1-p-tolyl-3-methyl-pyrazolone-(5). A pigment dyestuff was obtained which, worked into a graphic ink, yielded highly transparent orange dyeings.

We claim:

1. A dyestuff mixture consisting of two symmetrical disazo dyestuffs and one asymmetrical disazo dyestuff of the formulas

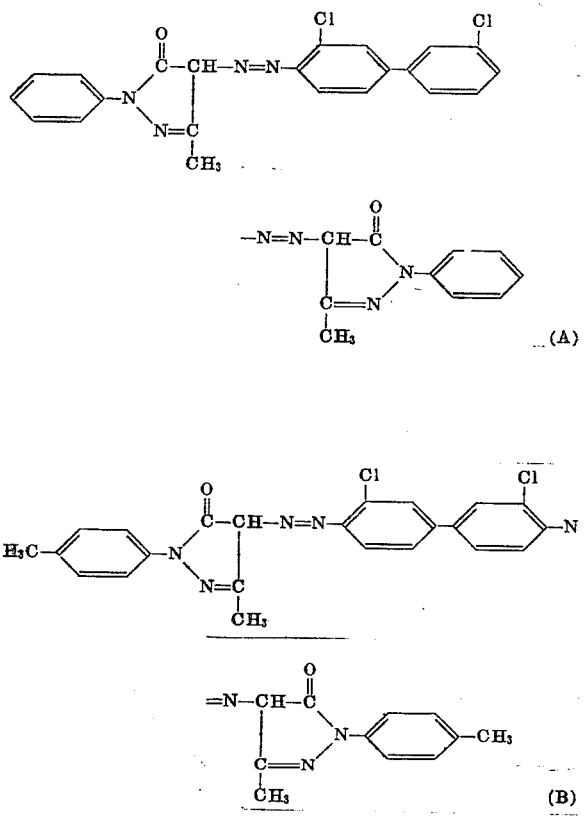

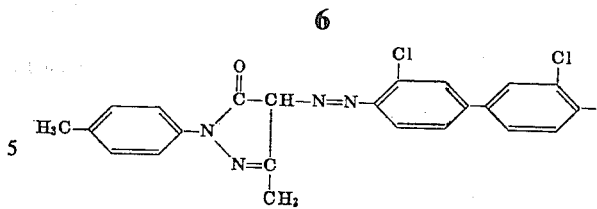

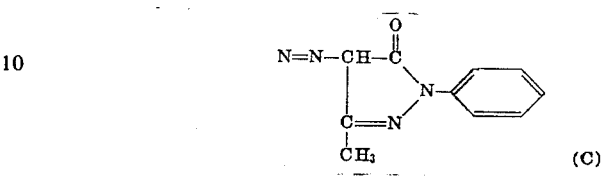

obtained by coupling in a molar ratio of 1:2 tetrazotized 4,4'-diamino-3,3'-dichlorodiphenyl with a mixture of 1-phenyl-3-methyl-pyrazolone-(5) and 1p-tolyl-3-methyl-pyrazolone-(5), the molar ratio of the coupling components being between 1:1 and 1:20.

2. A dyestuff mixture consisting of two symmetrical disazo dyestuffs and one asymmetrical disazo dyestuff of the formulas

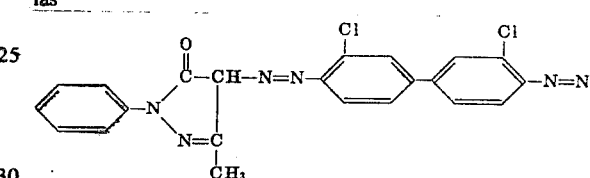

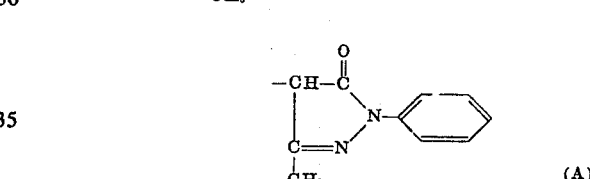

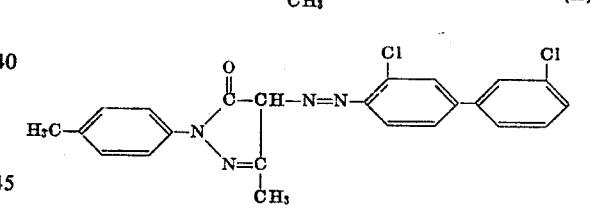

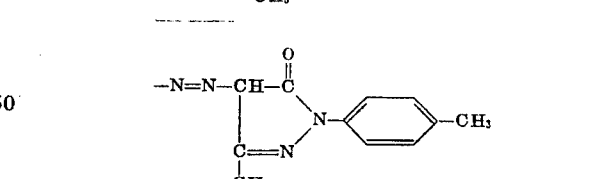

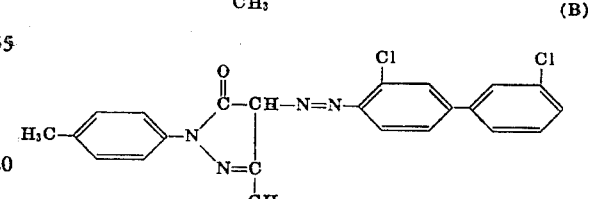

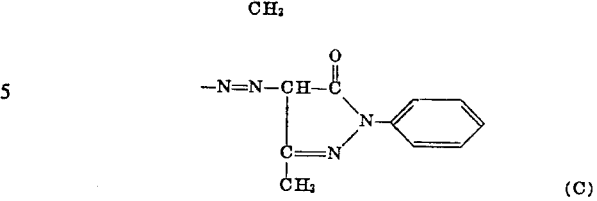

obtained by coupling in a molar ratio of 1:2 tetrazotized 4,4'-diamino-3,3'-dichlorodiphenyl with a mixture of 1-phenyl-3-methyl-pyrazolone-(5) and 1-p-tolyl-3-methyl-pyrazolone-(5), the molar ratio of the coupling components being between 1:1 and 1:5.

3. A process for preparing a dyestuff mixture consisting of two symmetrical disazo dyestuffs and one asymmetrical disazo dyestuff of the formulas

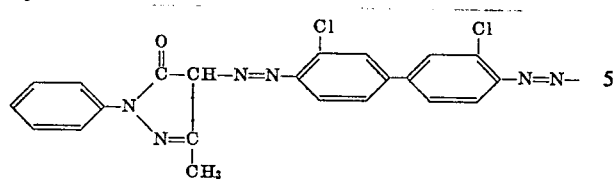

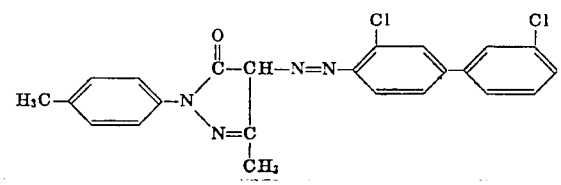

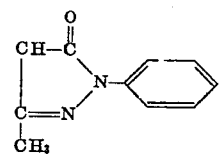

(A)

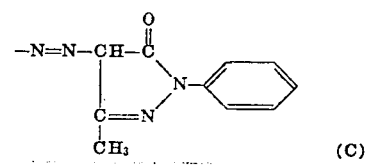

(C)

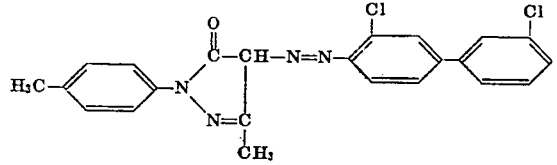

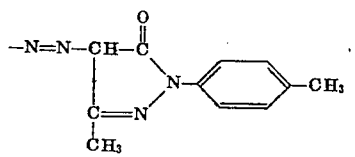

(B)

which comprises coupling in a molar ratio of 1:2 tetrazotized 4,4'-diamino-3,3'-dichlorodiphenyl with a mixture of 1-phenyl-3-methyl-pyrazolone-(5) and 1-p-tolyl-3-methyl-pyrazolone-(5) the molar ratio of the coupling components being between 1:1 and 1:20.

4. The process as claimed in claim 3, wherein the two coupling components are used in a molar ratio from 1:1 to 1:5.

* * * * *